United States Patent Office 3,463,562
Patented Aug. 26, 1969

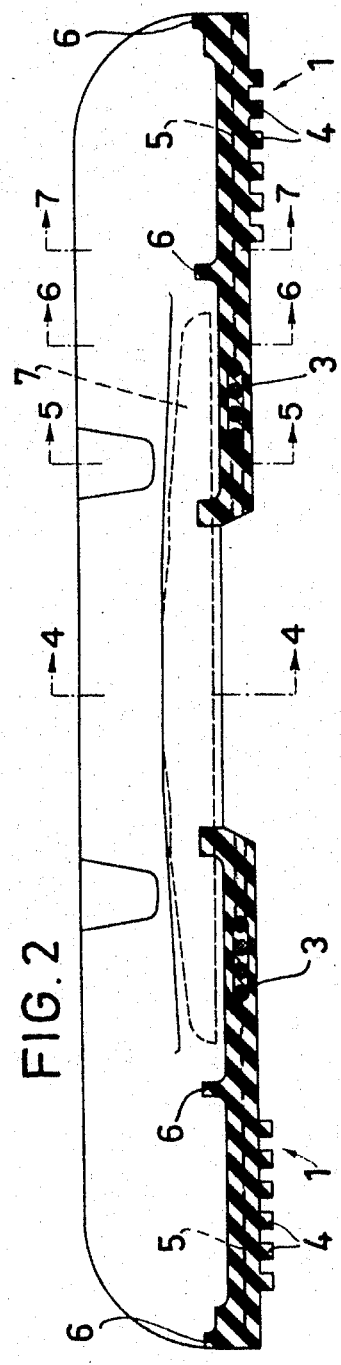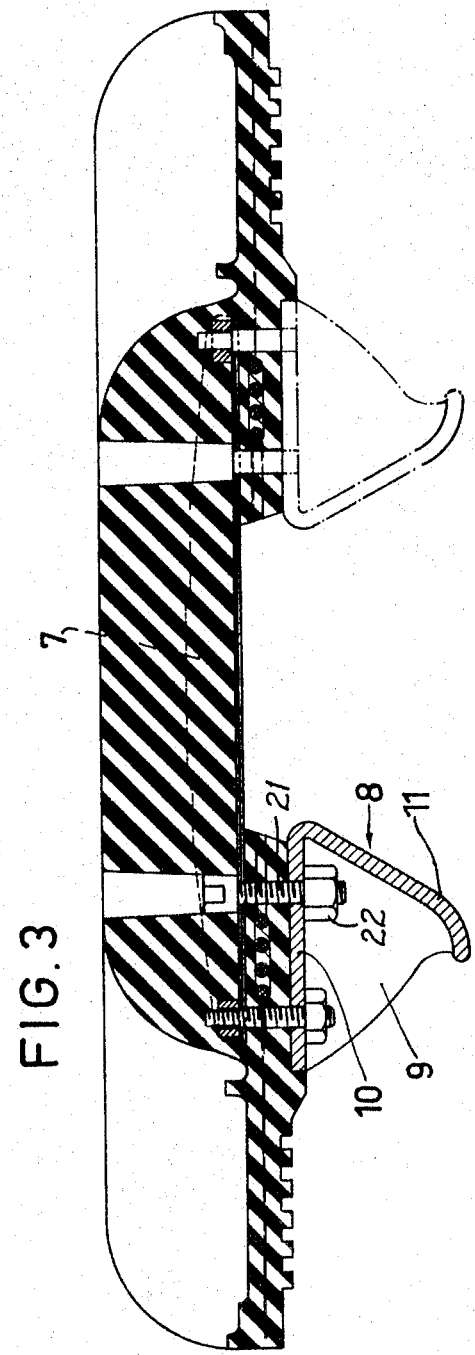
FIG. 2
FIG. 3
INVENTOR.
Assar N. Svensson
BY Sommers & Young
Attorneys

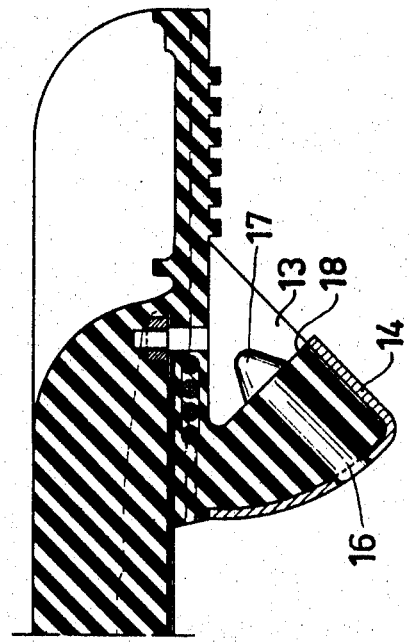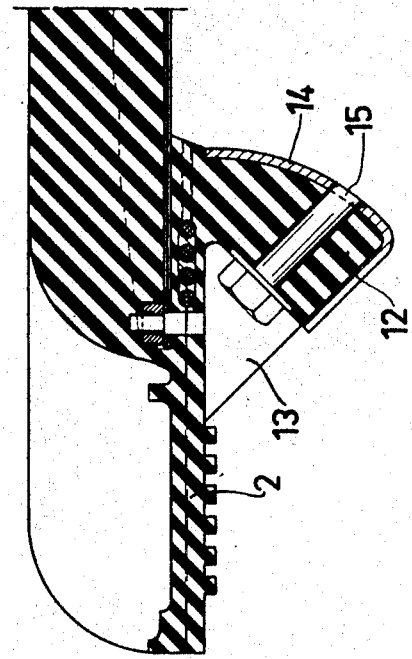

3,463,562
VEHICLE TRACK
Assar Natanael Svensson, Ersmark, Sweden, assignor to Skelleftea Gummifabriks AB, Ersmark, Sweden, a Swedish joint-stock company
Filed Aug. 4, 1967, Ser. No. 658,561
Claims priority, application Sweden, Aug. 22, 1966, 11,299/66
Int. Cl. B62d 55/26
U.S. Cl. 305—38    3 Claims

ABSTRACT OF THE DISCLOSURE

An endless track for a vehicle having two longitudinally extending parallel, spaced bands which are joined by longitudinally spaced transverse bars, the bands and the bars being, at least in part, integrally formed of an elastomeric material. Each bar comprises in part a U-shaped metal beam. Alternate ones of the bars extend the full width of the track and interspersed with these are shorter bars whose length corresponds substantially to the length of the associated U-shaped beam.

---

This invention relates to a vehicle track intended to be driven over rubber wheels and comprising longitudinal band members, transverse bars and side supports to abut to the rubber wheels, all comprised of the same elastomeric piece of material, the longitudinal band members and also the bars being provided with molded-in reinforcements.

Known vehicle tracks of this type show deficiencies with respect to their safe abutment to the rubber wheels, particularly when the vehicle turns on bare ground. According to the invention, the track is reinforced in its plane in the lateral directions, while at the same time good grip is maintained in deep snow and loose sand because the track maintains its flexibility relative to the ground support.

For imparting these properties to the vehicle track and thereby to effect an improvement in relation to known track types, the invention has been given the characterizing features defined in the following claims.

An embodiment of the invention is described in the following, with reference to the accompanying drawing figures.

FIG. 2 shows a cross-section in the section 2—2 in FIG. 1.

FIG. 3 shows a cross-section in the section 3—3 in FIG. 1.

FIG. 8 shows a portion of a section 3—3 according to FIG. 3, but with a different design of the side supports.

FIG. 9 shows the same as FIG. 8, but with still another design of the side supports.

Figure 1:
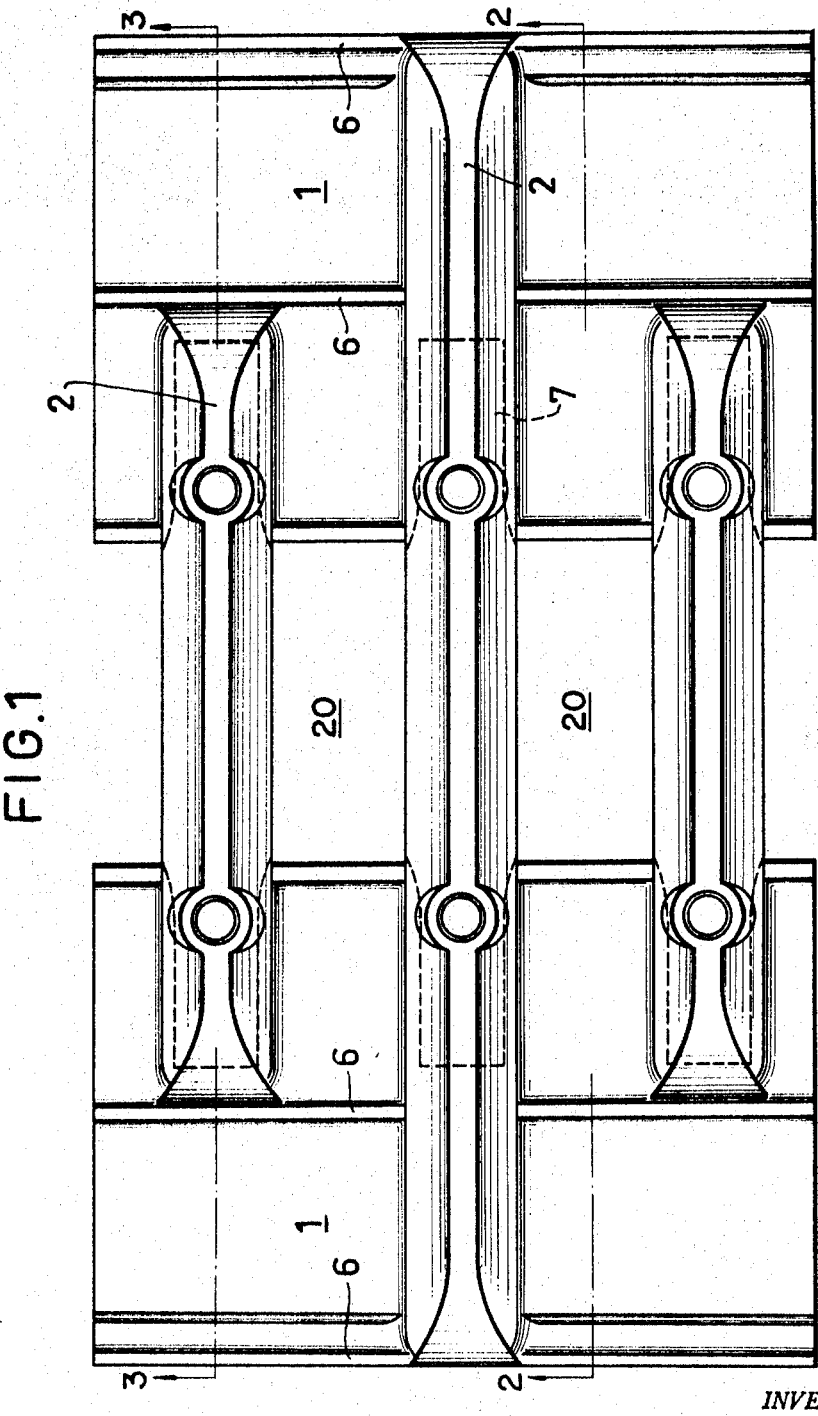
FIG. 1 shows a horizontal view of a part of the vehicle track.

The vehicle track comprises longitudinal band members 1, i.e. two elastic belts of, for example, rubber arranged in spaced side-by-side relationship. The belts are connected by transverse bars 2 which are formed of the same elastic material as the band members and have a substantial extension in height for gripping in the ground support. The spaced relationship of the belts 1 and members 2 forms opening 20. The track is carried by the rubber wheels of the vehicle running between the 1 and abutting the inner surfaces of the bars 2. The band members 1 and abutting the inner surfaces of the bars 2. The band members 1 are provided with reinforcing wires 3 of, for example, steel wire molded in the elements, and also a reinforcing cord 5 is cast in the band members. Onto the surface of the band members which faces the ground, longitudinal upstanding ribs 6 are molded to effect side stabilization when driving the vehicle on loose ground support. On the inside of the band members a plurality of longitudinal stiffening ridges 4 are formed.

Figure 4:
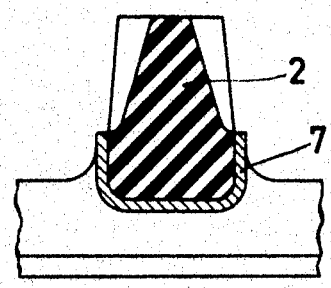
FIG. 4 shows a cross-section in the section 4—4 in FIG. 2.
Figure 5:
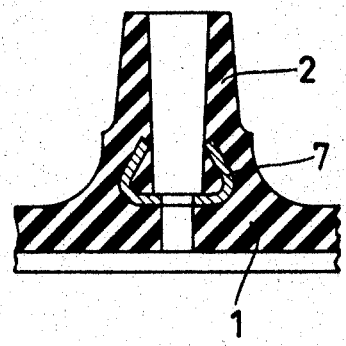
FIGS. 5–7 show corresponding cross-sections as FIG. 4, i.e. along the sections 5—5, 6—6 and 7—7.
Figure 6:
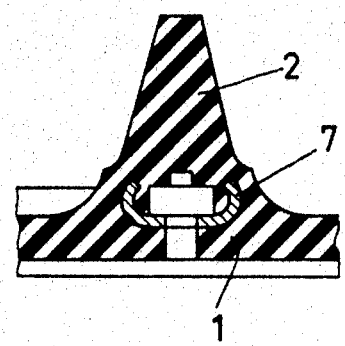
Figure 7:
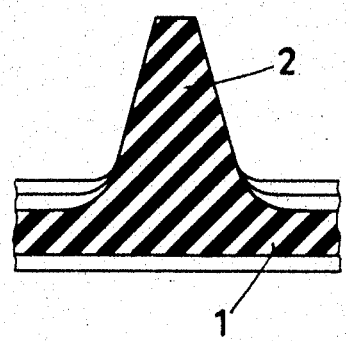

As appears from FIG. 1, every second bar 2 extends outwardly to the outer edges of the band members, and every other second bar extends to about the middle of the band member in question. This construction imparts to the outer portions of the track a suitable stability and flexibility against the ground support. A metal beam 7 is molded in each bar 2 the beam length being the same for all bar, i.e. it extends from the middle of one band member to the middle of the other band member. In FIGS. 1, 2 and 3 the metal beam 7 is shown by dashed lines, and in FIGS. 4–6 the change of the cross-sectional shape of the beam from the middle to the ends is illustrated. The beam 7, thus, has generally U-shape, the legs being directed to the ground side of the track. The metal beam is molded in the elastomeric band member and has straight legs at the central section (FIG. 4), but thereafter it has inwardly bent legs which also decrease in height toward the ends. The lowest profile height appears from FIG. 6. It can be noted that in the embodiment shown the U-beam side which faces the drive wheel is free of rubber in the area between the band members, see FIGS. 2 and 4. The load on the track, thus, is taken up by the drive wheels via the inside of the U-beams, providing a drive engagement of rubber against metal.

In the following, the side supports of the track against the drive wheels are described. The first embodiment thereof is shown in FIG. 3. The side supports have the shape of tongues 8 which have V-shaped cross-section, with one leg 10 being fastened to the band member 1 directly in front of a carrier member 2 by means of screw 21 and nut 22 and with the other leg 11 facing inwardly and constituting the guide surface against the outside of the drive wheel. There are always arranged two guide tongues 8 directly in front of each other, each tongue on its band member 2. The guide tongue 8 is made of metal and may be formed of a bent plate braced by a web 9. The leg 10 is secured on the inside of the track by screwing with two bolts. The guide leg 11 is given an arched shape in the plane which is parallel with the outside of the drive wheel. Said leg 11 is preferably formed tapering to its end edge and thereby given the shape of a "tooth" or "cup."

In FIGS. 8 and 9 two other forms of guide tongues are shown, in which figures only the left half and the right half of the track are illustrated. The form according to FIG. 8 comprises a rubber shoulder 12 molded in one piece with the traction element 2. The shoulder is supported by a web 13. The side of the guide tongue which faces the drive wheel is lined with a metal plate 14 which is bent about the outer surfaces of the shoulder and secured by a bolt 15.

The tongue shown in FIG. 9 differs from the tongue in FIG. 8 only in that the plate 14 is given a different mounting, in such a manner, that a pin 16 is provided which at its inner end has a head 17. The head is pressed through a hole in the rubber shoulder 12 and is fastened against a projection 18 at the inside of the shoulder. The plate 14, of course, can be secured to the rubber shoulder by vulcanisation, but its detachability is to be preferred.

What I claim is:
1. An endless track for a vehicle adapted to be driven over wheels formed of an elastic material and comprising, at least two longitudinally extending spaced parallel bands joined by longitudinally spaced transverse bars, said bands and said bars being integrally formed at least in part of an elastomeric material, each said transverse bar having molded therein a U-shaped metal beam having its legs facing toward the outer ground engaging surface and a length greater than the width of the space between said bands but less than the width of the track to thereby provide flexibility against the ground support, the elastomeric material of said transverse bars having a height in excess of the height of the legs of said U-shaped beam, at least some of said transverse bars having a length substantially corresponding to the total width of the track and being interspersed with other transverse bars whose length substantially corresponds to the length of the associated metal beam.

2. The endless track of claim 1 in which at least one longitudinally extending metallic reinforcing member is embedded within each said band.

3. The endless track of claim 1 in which the ground contacting surface of each said band is provided with at least one longitudinally extending upstanding rib.

References Cited

UNITED STATES PATENTS

| | | | |
|---|---|---|---|
| 2,461,849 | 2/1949 | Slemmons | 305—38 |
| 2,476,828 | 7/1949 | Skromme | 305—38 |
| 2,898,965 | 8/1959 | Eddy. | |
| 3,161,443 | 12/1964 | Svensson | 305—38 X |
| 3,205,023 | 9/1965 | Nodwell | 305—38 |
| 3,019,061 | 1/1962 | Schomers | 305—35 X |

RICHARD J. JOHNSON, Primary Examiner